J. JUBERT.
FRUIT PICKER.
APPLICATION FILED AUG. 19, 1913.
1,159,588.
Patented Nov. 9, 1915.
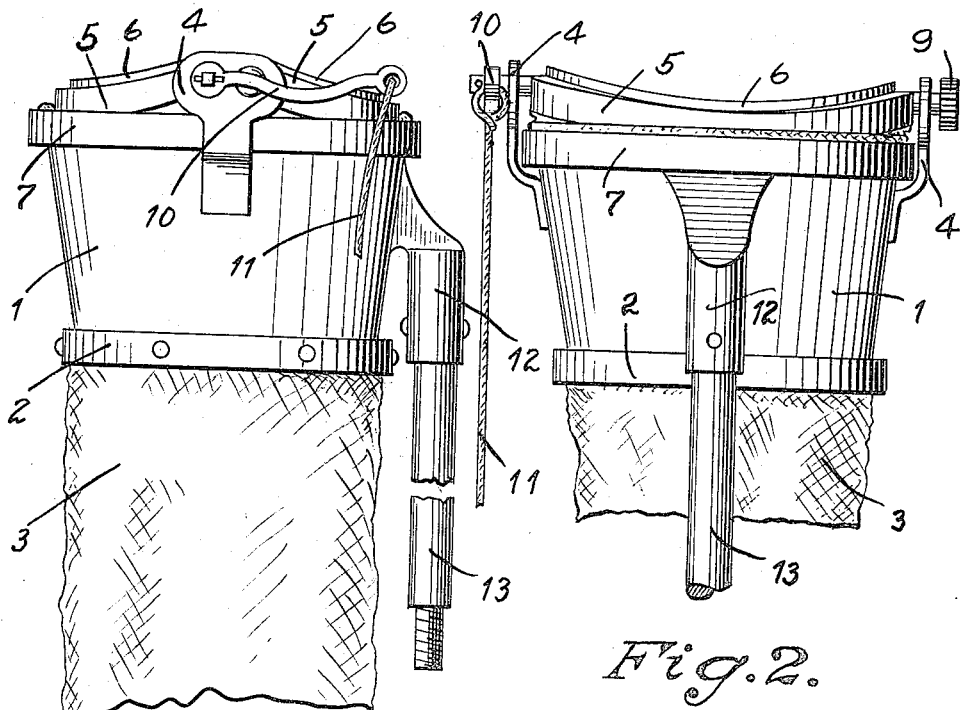
Fig. 1.
Fig. 2.
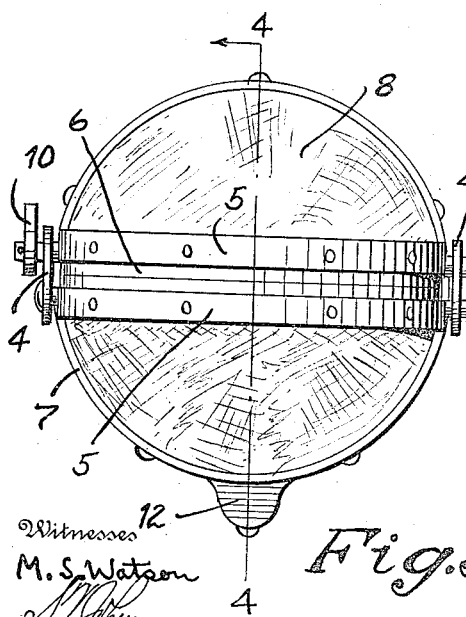
Fig. 3.
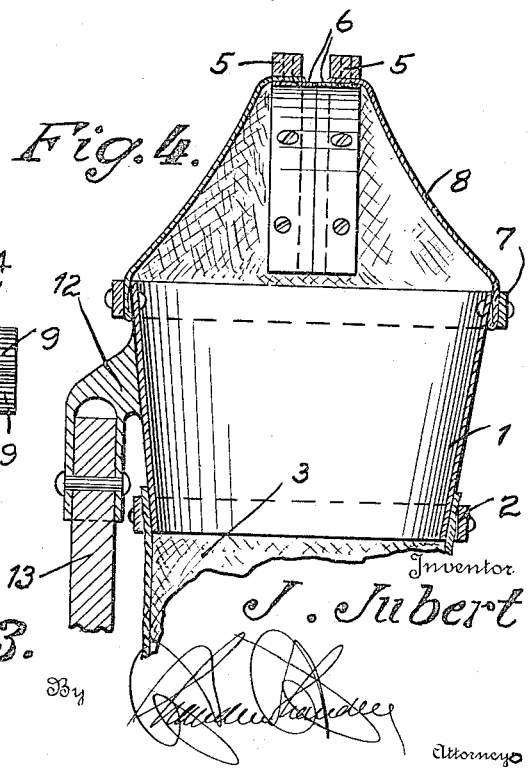
Fig. 4.
Witnesses
M. S. Watson
Inventor
J. Jubert
By
Attorney

UNITED STATES PATENT OFFICE.

JEDDIE JUBERT, OF ALBANY, NEW YORK.

FRUIT-PICKER.

1,159,588. Specification of Letters Patent. Patented Nov. 9, 1915.

Application filed August 19, 1913. Serial No. 785,502.

*To all whom it may concern:*

Be it known that I, JEDDIE JUBERT, a citizen of the United States, residing at Albany, in the county of Albany, State of New York, have invented certain new and useful Improvements in Fruit-Pickers; and I do hereby declare the following to be a full, clear, and exact description of the invention, such as will enable others skilled in the art to which it appertains to make and use the same.

The present invention is directed to improvements in fruit pickers, and has for its object to so construct a device of this character that the fruit can be conveniently and quickly picked by a person standing upon the ground.

A further object of the invention is to provide a device of this character which is exceedingly simple in construction, and one which will guide the picked fruit to the operator without bruising the same.

With these and other objects in view, this invention resides in the novel features of construction, formation, combination and arrangement of parts to be hereinafter more fully described, claimed and illustrated in the accompanying drawing, in which:—

Figure 1 is a side elevation of the device showing the jaws open. Fig. 2 is rear view showing the jaws open. Fig. 3 is a top plan view of the device showing the jaws in their operative position. Fig. 4 is a sectional view on line 4—4 of Fig. 3.

Referring to the drawing, the numeral 1 designates a sheet metallic band, the lower edge of which has bolted thereto a ring 2 which serves to clamp the upper end of the fabric chute 3.

Secured to the upper end of the band 1 are ears 4, said ears being arranged diametrically opposite and pivotally support the opposite ends of the arcuate jaws 5, said jaws being each provided with a similarly shaped cutting blade 6, said blade being bolted thereto.

A ring 7 is bolted to the upper edge of the band 1 and has clamped therebetween one of the edges of the webs 8, the other edges of which are clamped between the jaws 5 and cutting blade 6, and serve to guide the fruit when severed into the band and to the chute 3.

The arcuate jaws 5 are provided at one of their ends with intermeshing gears 9, so that when the lever 10, which is fixed to one of the jaws, and opposite the gears 9, is rocked upon pulling the cord 11 the jaws will be simultaneously swung to their operative position.

In operation the band 1 is placed in proper respect to the fruit to be severed and the lever 10 rocked, whereupon the jaws will swing upwardly, thereby permitting the blades to sever the fruit, which falls into the chute 3. Upon releasing the lever the jaws will swing, under their weight, to open positions.

One side of the band 1 is provided with a socket 12, and in which is fixed one end of the handle 13, which may be made in sections so as to pick fruit at different elevations.

What is claimed is:—

A fruit picker comprising a rigid band, a chute clamped to the lower end of said band, a socket carried by the band, a handle engaged in said socket, oppositely disposed ears carried by the upper end of the band and extending upwardly therefrom, arcuate jaws having their ends pivotally mounted in the ears, and adapted to lie substantially in the horizontal plane of the band when in inoperative positions, gears on said jaws arranged to intermesh, a lever carried by one of the jaws constructed and arranged to move the same about its pivots, coöperating cutting blades carried by the said jaws, webs connected to the jaws and to the band and arranged to lie within the said band when the jaws are in inoperative positions, and a flexible member connected to the lever for rocking the same to swing the jaws toward each other.

In testimony whereof, I affix my signature, in the presence of two witnesses.

JEDDIE JUBERT.

Witnesses:
H. VAN BEEVEN,
PETER HAFER.

Copies of this patent may be obtained for five cents each, by addressing the "Commissioner of Patents, Washington, D. C."